E. L. THURSTON.
FAUCET.
APPLICATION FILED MAR. 25, 1910.
988,521.
Patented Apr. 4, 1911.
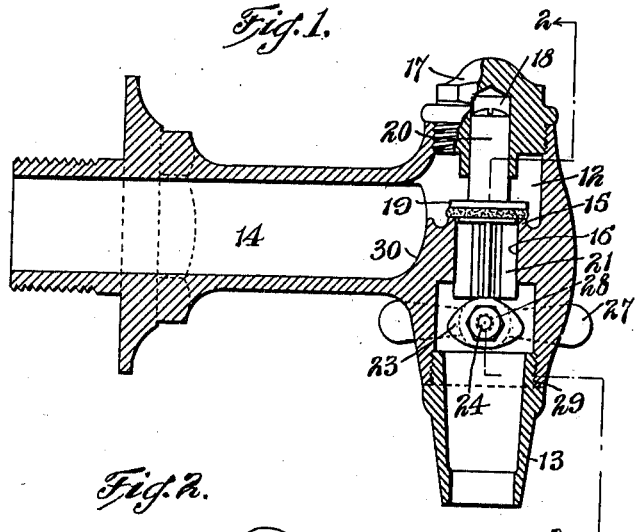
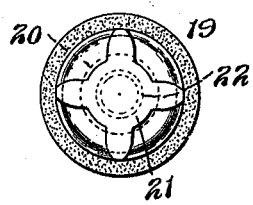
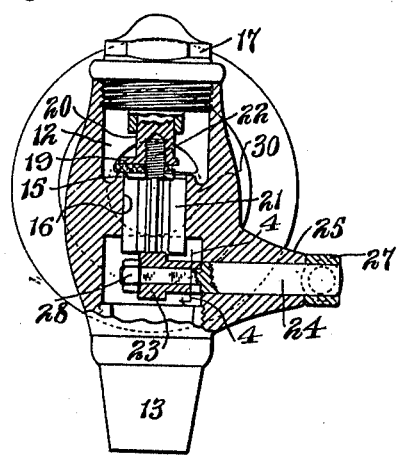
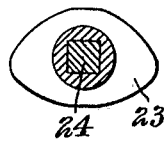
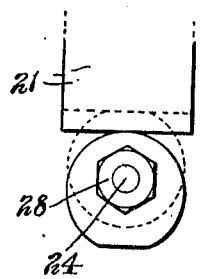
Witnesses:
Inventor:
Edwin L. Thurston,
By Wright, Brown, Quinby & May
Attys.
THE NORRIS PETERS CO., WASHINGTON, D. C.

UNITED STATES PATENT OFFICE.

EDWIN L. THURSTON, OF BOSTON, MASSACHUSETTS.

FAUCET.

988,521.  Specification of Letters Patent.  Patented Apr. 4, 1911.

Application filed March 25, 1910. Serial No. 551,530.

*To all whom it may concern:*

Be it known that I, EDWIN L. THURSTON, of Boston, in the county of Suffolk and State of Massachusetts, have invented certain new and useful Improvements in Faucets, of which the following is a specification.

This invention relates to faucets of the class illustrated in Patent No. 953,186, granted March 29, 1910, in which a cam is utilized to lift the valve from its seat, the return of the valve to its seat being effected by water pressure.

One of the objects of the invention is to provide a faucet which, with a slight and easily made alteration, can be changed from a self-closing one, to one which can be left open.

Another object of the invention is to provide an improved structure which results in avoiding the "hammering" which is objectionable in many faucets of this type.

Another object is to provide a structure which will enable a person to know at a glance whether the valve has been left open or closed, when water pressure has been shut off from the system.

To these ends, the invention consists in the construction and combination of parts substantially as hereinafter described and claimed.

Of the accompanying drawings, forming a part of this specification,—Figure 1 represents a longitudinal section of a faucet embodying the invention. Fig. 2 represents a section on line 2—2 of Fig. 1. Fig. 3 is a detailed under plan view of the valve, on an enlarged scale. Fig. 4 represents a detail section on line 4—4 of Fig. 2, on an enlarged scale. Fig. 5 is a view similar to a portion of Fig. 1, but on a larger scale, and illustrating a different shape of cam which may be employed.

Similar reference characters indicate the same or similar parts in all the figures.

The casing of the improved faucet includes a valve chamber 12, a discharge nozzle 13 in alinement with the valve chamber, an inlet 14 communicating with the valve chamber, and a valve seat 15 between the inlet and outlet, said valve seat being an inwardly projecting flange surrounding an opening 16 through which water passes when the valve, hereinafter described, is open. The upper end of the valve chamber 12 is provided with an internally screw-threaded opening in which is detachably secured an externally-threaded plug 17 which closes said opening, and is provided with a longitudinal socket 18 forming a guide for the stem of the valve, said guide being in alinement with the longitudinal center of the valve chamber, the valve seat, and outlet nozzle.

19 represents a valve which is located in the chamber 12, and is adapted to be seated on the valve seat 15, and close the opening 16. The valve is provided with a stem 20 having a sliding fit in the guide 18, said guide and stem maintaining the valve in a position parallel with the valve seat.

21 represents a foot which is secured to the valve and has parallel ribs, the outer edges of which fit the opening 16. Said foot is provided with a screw-threaded shank 22 which engages an internally threaded socket in the valve stem 20, provision being thus made for detachably connecting the foot with the valve. When the plug 17 is removed, the stem 20 can be grasped and the valve lifted out, the foot 21 passing freely out through the opening 16.

The cam 23, shown in Figs. 1 and 4, has an angular opening and engages an angular portion of a shaft 24 which is journaled in the bearing 25 formed at one side of the casing. The outer end of the shaft 24 has a handle 27 secured to it, said handle being so connected to the shaft that when the handle extends crosswise, as in Fig. 1, a lower portion of the cam is in engagement with the foot 21, so that the valve is free to be seated by the water pressure. In other words, when the valve is closed, the handle extends horizontally; but when the handle is turned to open the valve, said handle will be vertical, or substantially so. The cam is removably held in position on the angular portion of the shaft by means of a nut 28, fitting a screw-threaded end portion of the shaft.

The nozzle or bib portion 13 of the faucet is removable, preferably by a screw-threaded connection 29, the location of this point of separability of the parts being close to the shaft, so that when said bib 13 is removed, access to the nut 28 is easy so that the nut can be taken off, the cam 23 removed, and a cam of another form substituted therefor. The cam having the shape shown in Figs. 1 and 4 is practically incapable of holding the valve raised from its seat when the water is flowing past the valve, unless a person retains a grasp of the handle. In other words, when a cam such as shown at 23, is used, the faucet automatically closes by water pressure whenever the handle is released. A faucet operating in this manner is preferred in many locations, especially public buildings. But ordinarily, in residences, faucets are preferred which can be left open. To adapt my improved faucet so that it can be used in the preferred manner mentioned in residences, the bib 13 is removed, the nut 28 unscrewed, and the cam 23 replaced by one having a shape such as shown, for instance, in Fig. 5, at 23ˣ. Said cam 23ˣ is shown as an eccentrically mounted disk, but having a portion flattened where the radius is the greatest, so that when the shaft is actuated to rotate the cam from the position shown by full lines in Figs. 5, to the position indicated by dotted lines in Fig. 5, the valve will remain open, because the lower end of the foot 21 bears on the flat portion of the cam.

It is to be understood that I do not limit myself to the particular shapes of cams illustrated, as I may employ any forms that may be preferred, it being essential, however, to this feature of my invention, that one of the cams will be incapable of holding the valve raised, while the other cam will be so shaped that it can be left in a position to hold the valve above its seat. And, of course, in connection with this feature of my invention, it is essential that the casing of the faucet shall be made in parts, one portion of which can be removed, to enable one cam to be substituted for the other, the line of division of the parts being close to the cam and shaft.

An especial reason for providing a handle which will show when the valve is closed is that it sometimes happens that after water has been cut off from a building, some one tries to draw water and leaves the valve open. It is then customary for an inspector to go around and examine different faucets to see that all are closed before the water is turned on again in the building. With the ordinary faucet, there is no way of determining at a glance whether or not the valve is closed. But with my improved faucet, an inspector can tell at once whether the valve is shut or not, without going to it to make tests.

Referring to Fig. 1, it will be seen that the plane of the valve seat 15 is considerably above the bottom of the inlet 14, an upwardly curved wall being presented at 30. And it will also be observed that the bottom of the plug 17 is considerably above the top of the inlet 14. I have found by experiments that this formation results in avoiding "hammering" of the valve, and I believe it to be due to the fact that an air cushion is formed above the water in the chamber 12 and below the bottom of the plug 17, and the further fact that some of the water flowing through the inlet toward the valve chamber, striking the curved wall 30 and being deflected upward, prevents such a direct and rapid current of water laterally against the valve and its stem as would start the valve to "hammering."

I claim:—

1. A faucet comprising a casing having a removable bib, a shaft mounted in said casing close to the point of conection of the bib to the casing, a cam removably mounted on the inner end of the shaft, and a valve adapted to be actuated by said cam.

2. A faucet comprising a casing having a valve chamber and an inlet leading to said valve chamber and formed with a valve seat at the bottom of the valve chamber, but above the plane of the bottom of the inlet, the lower part of the end of the inlet which communicates with said valve chamber presenting an upwardly curved wall, a valve to coöperate with said seat and having a foot, a cam to engage said foot, and means for actuating the cam, the casing being formed to provide an air cushion above the valve, and above the top of said curved wall.

3. A faucet comprising a casing having a valve chamber, a removable discharge bib in alinement with the valve chamber, a valve seat between the valve chamber and outlet bib, an inlet leading to the chamber above the valve seat, one end of the valve chamber having an opening and a removable plug which closes said opening, said plug being provided with a guide in alinement with the longitudinal axis of the chamber, a valve mounted in the valve chamber and having a stem movable in said guide, a foot connected to the valve and projecting below it through the valve seat, a shaft journaled in one side of the faucet casing above the point of connection of the removable bib, said shaft having an angular portion and a threaded end, a cam having an angular opening fitting the angular portion of the shaft, and a nut on the threaded end of the shaft, said shaft having a handle for actuating it.

In testimony whereof I have affixed my signature, in presence of two witnesses.

EDWIN L. THURSTON.

Witnesses:
C. F. BROWN,
JAS. H. CHURCHILL.

---

Copies of this patent may be obtained for five cents each, by addressing the "Commissioner of Patents, Washington, D. C."